United States Patent [19]

Park et al.

[11] Patent Number: 5,553,802
[45] Date of Patent: Sep. 10, 1996

[54] OPPRESSIVE SENSATION REDUCER FOR SAFETY BELT OF AUTOMOBILE

[75] Inventors: Jang W. Park; Sung W. Jin; Tae B. Kwag, all of Kangwon-do, Rep. of Korea

[73] Assignee: Sungwoo Allied Signal Corp., Seoul, Rep. of Korea

[21] Appl. No.: 324,612

[22] Filed: Oct. 18, 1994

[30] Foreign Application Priority Data

Dec. 3, 1993 [KR] Rep. of Korea ............... 93-26184
Oct. 6, 1994 [KR] Rep. of Korea ............... 94-25503

[51] Int. Cl.$^6$ ................................ B60R 22/44
[52] U.S. Cl. ........................... 242/372; 242/379.2
[58] Field of Search ................. 242/372, 519, 242/379.2; 280/801.1, 807

[56] References Cited

U.S. PATENT DOCUMENTS 4,342,435  8/1982  Yanagihara ............... 280/807
4,564,153  1/1986  Morinaga et al. .

FOREIGN PATENT DOCUMENTS

0520479A1  12/1992  European Pat. Off. ........... 242/372

OTHER PUBLICATIONS

European Patent Application Publication No. 0 411 738 A2 Published Feb. 6, 1991.

Primary Examiner—John P. Darling
Attorney, Agent, or Firm—Banner & Allegretti, Ltd.

[57] ABSTRACT

An oppressive sensation reducer for safety belt wherein a reducer spring and a normal spring to which outer ends are fixed are installed in a reducer spring container and a normal spring container formed in a spring holder, a spring plate and a spring spacing plate coming into contact with a plate mounting surface are installed on both sides of the normal spring, a bush shaft and a stay shaft to which inner ends are fixed are connectedly installed in the center portion of the reducer spring and normal spring, thereby simplifying the structure and facilitating the fabrication.

12 Claims, 4 Drawing Sheets

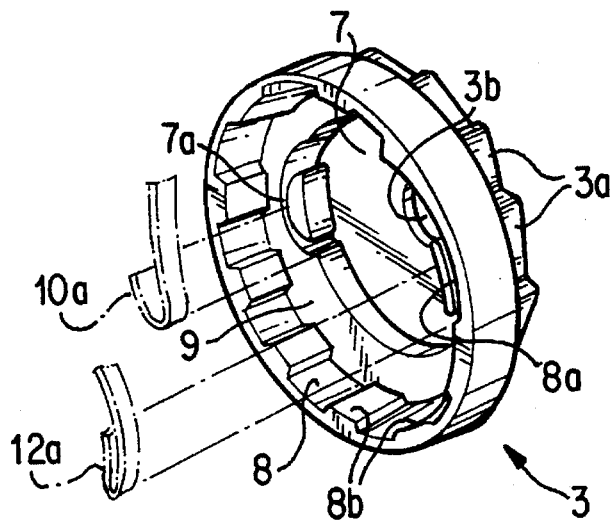
FIG. 2
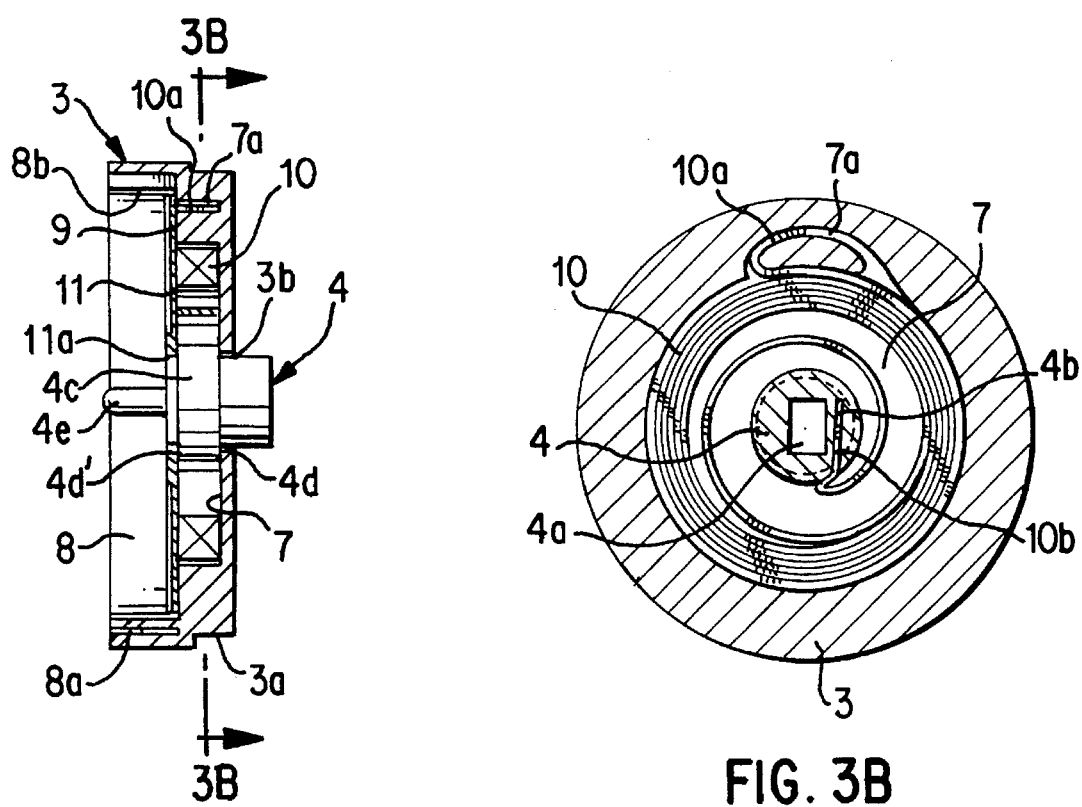
FIG. 3A
FIG. 3B

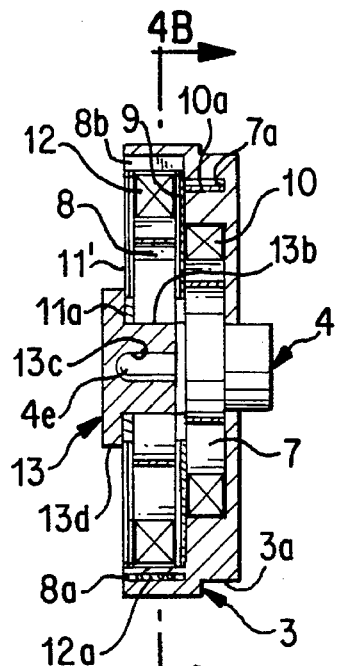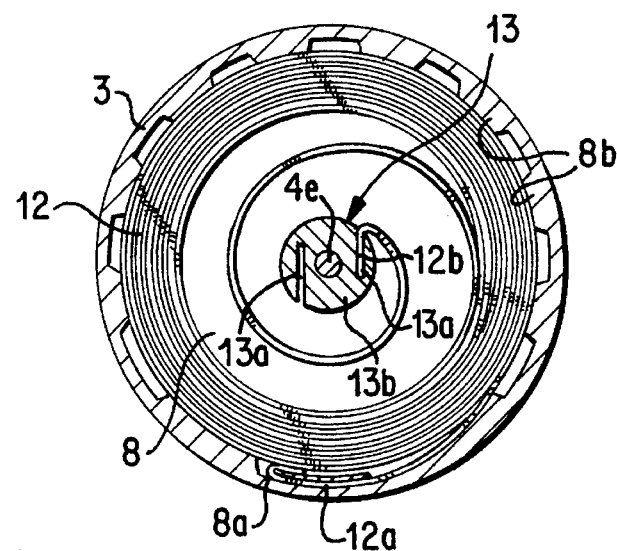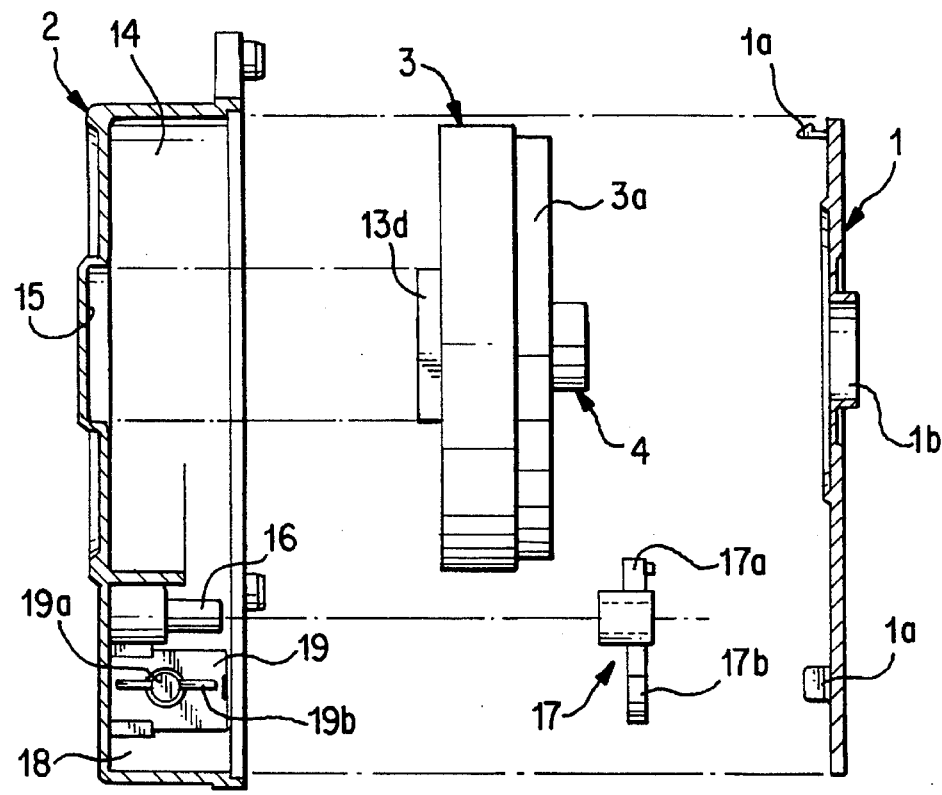

OPPRESSIVE SENSATION REDUCER FOR SAFETY BELT OF AUTOMOBILE

BACKGROUND OF THE INVENTION

The present invention relates to an oppressive sensation reducer for the safety belt of automobile where a spring for taking up the safety belt is employed, and more particularly, to an oppressive sensation reducer for the safety belt of automobile, which is simplified in structure with smooth performance and more easy and rapid to fabricate.

Generally, a safety belt installed in the seats of an automobile has an oppressive sensation reducer which is wound back by the force of a spring. In such a device a wound spring formed by taking up a plate spring like a spiral spring is used in order to obtain a spring force for automatically taking up the safety belt.

For the wound spring, the oppressive sensation reducer for safety belt employs two springs of a normal spring and a reducer spring. A conventional apparatus has a dual structure in which the normal spring is provided inside the case and the reducer spring is installed in a holder. This structure complicates the whole configuration and fabrication of the apparatus.

The relatively many number of members and poor fabricability result in low productivity and increase in cost. Moreover, due to the large volume, the apparatus looks unshapely to decrease commercial value thereof.

SUMMARY OF THE INVENTION

Therefore, it is an object of the present invention to provide an oppressive sensation reducer for the safety belt of an automobile, which is simplified in structure and easy to fabricate as well as faithfully performing the oppressive sensation reducing function.

It is another object of the present invention to provide an oppressive sensation reducer for the safety belt of an automobile, which seeks the enhancement in productivity with an improved fabricability and decrease in cost.

It is still another object of the present invention to provide an oppressive sensation reducer for the safety belt of an automobile, which becomes compact.

In order to accomplish the objects, there is provided an oppressive sensation reducer for safety belt wherein a spring holder having a ratchet is rotatably installed centering on a bush shaft in a case coupled to a retainer, the reducer comprising a reducer spring, a normal spring, a solenoid and a rotation blocking lever, wherein the reducer spring and normal spring to which outer ends are fixed are installed in a reducer spring container and a normal spring container formed in the spring holder, wherein a spring plate and a spring spacing plate coming into contact with a plate mounting surface are installed on both sides of the normal spring, wherein the bush shaft and a stay shaft to which inner ends are fixed are connectedly installed in the center portion of the reducer spring and normal spring.

BRIEF DESCRIPTION OF THE INVENTION

FIG. 2 is a perspective view of the important components of a spring holder of the present invention;

FIGS. 3A, 3B, 4A and 4B illustrate the first step of fabrication in the present invention, with FIGS. 3A and 4A showing vertical cross-sectional views of the present invention and FIGS. 3B and 4B showing cross-sectional views cut along line A-A' of FIG. 3A or line B-B' of FIG. 4A;

FIGS. 5 and 6 are plan cross-sectional views of illustrating the second step of fabrication in the present invention.

DETAILED DESCRIPTION OF THE INVENTION

Figure 1:
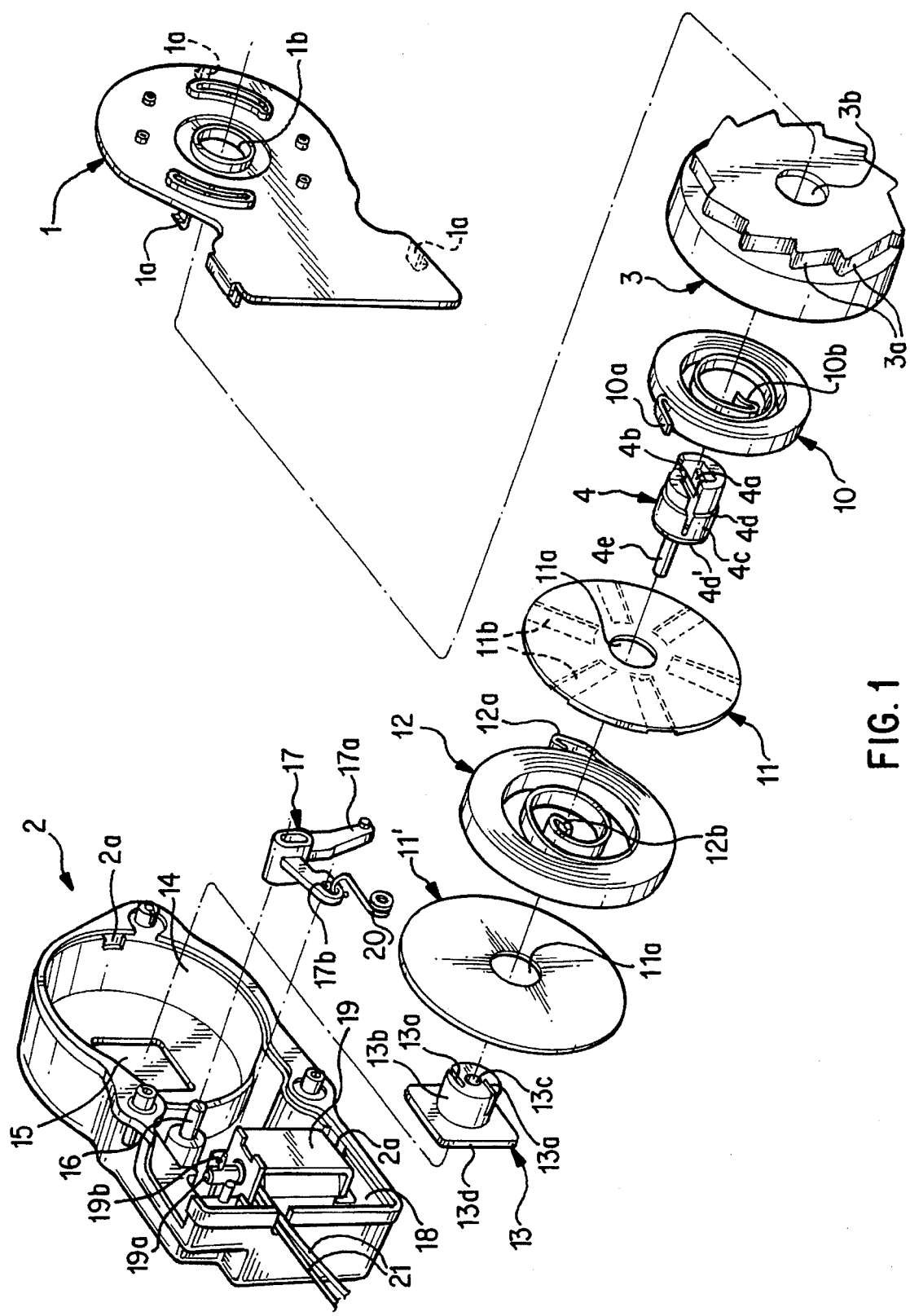
FIG. 1 is an exploded perspective view of the present invention.

The oppressive sensation reducer for safety belt of the present invention comprises a retainer 1 and a case 2. A coupling protrusion 1a of retainer 1 is fitted into a coupling hole 2a of case 2 so that they are tied together.

A spring holder 3 having a ratchet 3a on one side is installed to rotate centering on a bush shaft 4 inside retainer 1 and case 2. Bush shaft 4 penetrates a holder center hole 3b and is supported by a retainer center hole 1b. A spool shaft 6 of a retractor 5 is inserted into a shaft coupling hole 4a.

Referring to FIG. 2, a reducer spring container 7 and a normal spring container 8 which are open in one direction, are provided in the spring holder 3. Reducer spring container 7 formed inward has a smaller diameter whereas normal spring container 8 formed outward has a greater diameter. Between them is formed a plate mounting surface. Spring hooks 7a and 8a and inner-surface protrusions 8b are formed at equal intervals on the inner surface of the respective containers.

The hooks are placed inside reducer spring container 7 so that the outer end 10a of reducer spring 10 is inserted into spring hook 7a. After this step, bush shaft 4 is fabricated.

In bush shaft 4, a spring hook 4b to which an inner end 10b of reducer spring 10 is inserted and hooked is formed lengthwise. Bush shaft 4 further comprises a spring spacing portion 4c, front and rear stop portions 4d and 4d', and a supporting axis 4e.

A spring spacing plate 11 installed after bush shaft 4 is fabricated and a spring plate 11' installed after normal spring 12 is fabricated, each have a center hole 11a for fabrication. A plurality of non-contact recesses 11b for minimizing the spring contact area are formed radially on one side of the circumference of spring spacing plate 11.

Normal spring 12 is constructed so that an outer end 12a is inserted into spring hook 8a of normal spring container 8 of spring holder 3. An inner end 12b is fixedly inserted into spring hook 13a of stay shaft 13 penetrating center hole 11a of spring plate 11'.

Spring hook 13a of stay shaft 13 is formed on both sides of axial hole 13c of shaft 13b, thereby facilitating fabrication. A rectangular rotation blocking piece 13d hooked by spring plate 11' is integrally formed on shaft 13b.

In case 2, a rectangular rotation blocking recess 15 to which rotation blocking piece 13d of stay shaft 13 is formed on the inner surface of holder rotation cavity 14. On one side of holder rotation cavity 14, a rotation blocking lever 17 fabricated to a lever axis 16 is installed. A blocking rod 17a is blocked by ratchet 3a by the operation of flange 19a of solenoid 19 in which rotation blocking lever 17 is fixedly provided in a solenoid container 18. The release of the blocking is carried by causing a lever return spring 20 to return the rotation blocking lever to the original release position.

A reference number 17b represents a pin hole. A reference number 19b represents a flange pin. A reference number 21 represents a wire.

The present invention has roughly two steps of fabrication. In the first step, as shown in FIGS. 3A and 3B, reducer spring 10 is first installed in reducer spring container 7 of spring holder 3. Then, bush shaft 4 and spring spacing plate 11 are fabricated.

In this fabrication, front stop portion 4d of bush shaft 4 is blocked by the outer portion of holder center hole 3b. This prevents the separation of the bush shaft. Spring spacing plate 11 is blocked by rear stop portion 4d' so that bush shaft 4 is rotatable and has a room of reducer spring container 7.

As shown in FIGS. 4A and 4B, normal spring 12 is installed in normal spring container 8 and spring plate 11' covers it. Then, stay shaft 13 is fabricated. Here, the inner end 12b of normal spring 12 which is seen through center hole 11a of spring plate 11' is hooked by spring hook 13a so that fabrication is performed while supporting axis 4e of bush shaft 4 is inserted into axial hole 13c and simultaneously rotation blocking piece 13d is blocked by the circumference of spring plate 11'. In the second step of fabrication, spring holder 3 finished for fabrication in the first step is incorporated in holder rotation cavity 14 (see FIGS. 5 and 6). Here, when spring holder 3 is inserted into holder rotation cavity 14, rotation blocking piece 13d is fitted into rotation blocking recess 15 and stay shaft 13 does not rotate.

Figure 6:
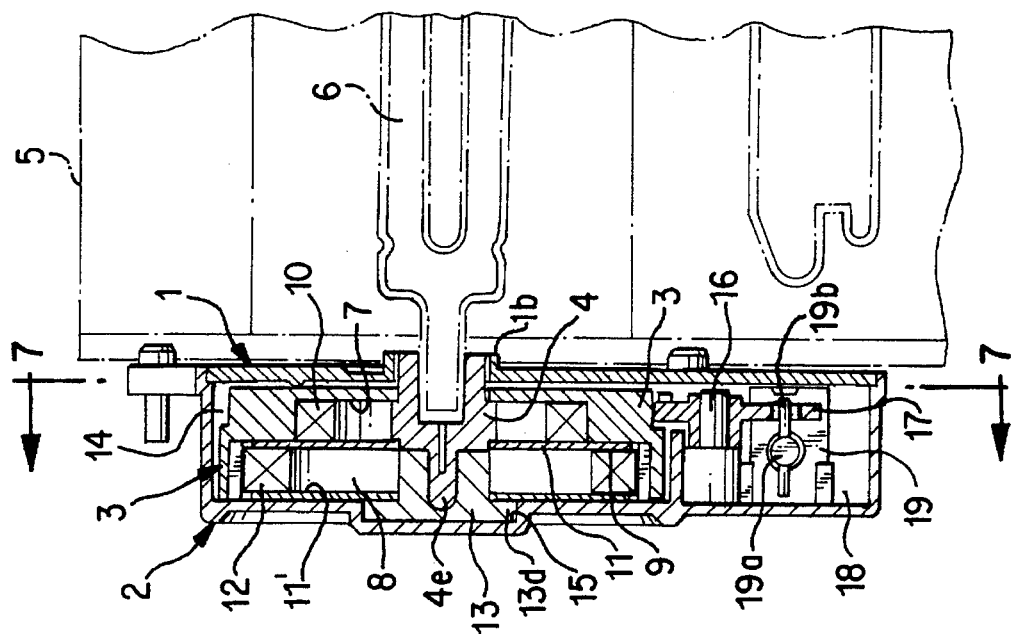

Subsequently, after the fabrication of spring holder 3, rotation blocking lever 17 is fabricated to lever axis 16. After the fabrication of lever return spring 20, retainer 1 sticks to the outside of case 2. This is the finish of fabrication as shown in FIG. 6.

In this invention, when bush shaft 4 rotates by the rotation of spool shaft 6 by drawing out the safety belt while installed in retractor 5, reducer spring 10 is wound because the end 10b of spring is fixed. When reducer spring 10 is fully wound, the whole reducer spring 10 rotates so that spring holder 3 to which outer end 10a is fixedly tied rotates.

Figure 7:
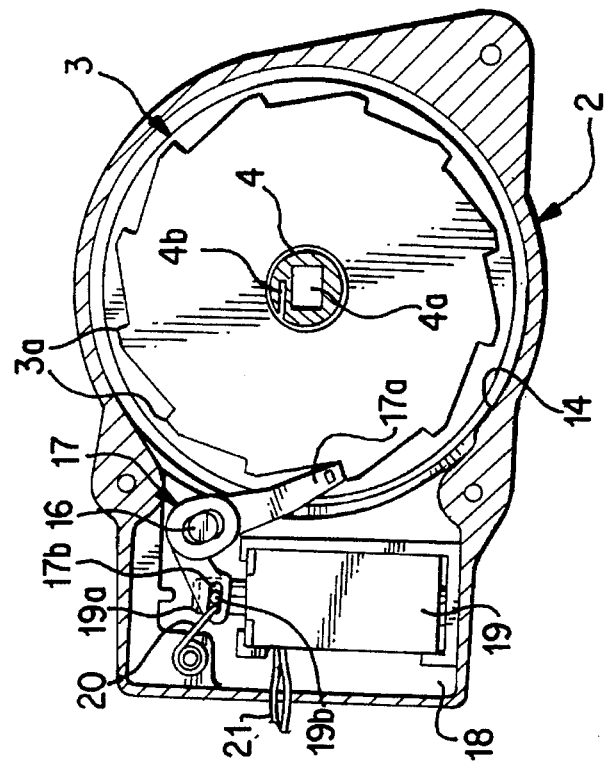
FIG. 7 is a cross-sectional view of FIG. 6 cut along line C-C'.

Further, when spring holder 3 rotates, normal spring 12 is wound. In a state in which the normal spring 12 is wound to a certain degree, when a user connects the safety belt to the buckle, solenoid switch (not shown) operates to cause solenoid 19 to operate. For this reason, flange 19a retreats and blocking rod 17a of rotation blocking lever 17 is blocked by ratchet 3a. This prevents spring holder 3 from rotating (see FIG. 7).

In this state, reducer spring 10 and normal spring 12 are in a state of being wound and thereby have a resilient force. For this, when the safety belt is released from the buckle, the solenoid switch turns off, resulting in loss of the latching function of solenoid 19. Blocking rod 17a detaches from ratchet 3a by the force of lever return spring 20.

In this state, since spring holder 3 is free to rotate, bush shaft 4 and spool shaft 6 connected thereto reversely rotate due to the spring force of reducer spring 10 and normal spring 12. This takes up the safety belt.

As described above, the present invention is constructed to faithfully perform a function as the oppressive sensation reducer for safety belt and also easy and rapid to fabricate. Therefore, the present invention involves an increase in productivity and decrease in cost due to simplification of structure.

Moreover, in this invention reducer spring 10 and normal spring 12 are incorporated in spring holder 3 so that the whole device becomes compact to enhance its design and commercial value.

What is claimed is:

1. An oppressive sensation reducer for safety belt wherein a spring holder having a ratchet is rotatably installed centering on a bush shaft in a case coupled to a retainer, said reducer comprising a reducer spring, a normal spring, a solenoid and a rotation blocking lever, wherein said reducer spring and normal spring are respectively installed in a reducer spring container and a normal spring container formed in said spring holder, said reducer spring having an outer end fixed to said reducer spring container, and said normal spring having an outer end fixed to said normal spring container, wherein a spring plate and spring spacing plate are installed on both sides of said normal spring, and said spring spacing plate is placed in contact with a plate mounting surface formed in said spring holder, and wherein said bush shaft and a stay shaft are respectively installed in the center portion of said reducer spring and normal spring, with an inner end of said reducer spring fixed to said bush shaft and an inner end of said normal spring fixed to said stay shaft.

2. An oppressive sensation reducer for safety belt of an automobile as claimed in claim 1, wherein said outer ends of said reducer spring and normal spring are fixedly inserted into spring hooks formed on the inner circumference of said reducer spring container and normal spring container, wherein said inner ends of said reducer spring and normal spring are fixedly inserted into spring hooks formed on said bush shaft and stay shaft.

3. An oppressive sensation reducer for safety belt of an automobile as claimed in claim 1, wherein a front stop portion is formed on said bush shaft, and said front stop portion is blocked by an outer surrounding portion of a center hole formed in said spring holder.

4. An oppressive sensation reducer for safety belt of an automobile as claimed in claim 1, wherein a rear stop portion is formed at the end of a spring spacing portion of said bush shaft, thereby blocking said spring spacing plate.

5. An oppressive sensation reducer for safety belt of an automobile as claimed in claim 1, wherein a supporting shaft inserted into an axial hole of said stay shaft is provided at the end of said bush shaft rotating with the front end supported by a center hole of a retainer.

6. An oppressive sensation reducer for safety belt of an automobile as claimed in claim 1, wherein a shaft is provided on said stay shaft coupled to said bush shaft.

7. An oppressive sensation reducer for safety belt of an automobile as claimed in claim 1 or 6, wherein a pair of spring hooks are formed opposite a shaft of said stay shaft.

8. An oppressive sensation reducer for safety belt of an automobile as claimed in claim 1, wherein a rotation blocking piece is formed at the end of said stay shaft and is secured to said case.

9. An oppressive sensation reducer for safety belt of an automobile as claimed in claim 1, wherein a rotation blocking recess to which a rotation blocking piece of said stay shaft is inserted is formed on the inner surface of a holder rotation cavity of said case.

10. An oppressive sensation reducer for safety belt of an automobile as claimed in claim 9, wherein said rotation blocking piece of said stay shaft and said rotation blocking recess of said case are formed in rectangle.

11. An oppressive sensation reducer for safety belt of an automobile as claimed in claim 1, wherein a plurality of non-contact recesses are radially formed on one side of the circumference of said spring spacing plate.

12. A method for fabricating an oppressive sensation reducer for seat belt of an automobile as claimed in claim 1 wherein:

said reducer spring, bush shaft, spring spacing plate, normal spring, spring plate, and stay shaft are installed in said spring holder in a first fabrication step; and said spring holder is incorporated into said case in a second fabrication step.

* * * * *